United States Patent [19]
Gammel et al.

[11] Patent Number: 5,752,231
[45] Date of Patent: May 12, 1998

[54] METHOD AND SYSTEM FOR PERFORMING SPEAKER VERIFICATION ON A SPOKEN UTTERANCE

[75] Inventors: Michele B. Gammel, Farmers Branch; Joseph A. Adamo, Plano, both of Tex.

[73] Assignee: Texas Instruments Incorporated, Dallas, Tex.

[21] Appl. No.: 600,387

[22] Filed: Feb. 12, 1996

[51] Int. Cl.⁶ .................................................. G10L 3/00
[52] U.S. Cl. ...................... 704/273; 704/270; 704/246; 704/200
[58] Field of Search ..................... 395/2.79, 2.82, 395/2.1, 2.4, 252, 2.6; 704/200, 201, 231, 243, 251, 270, 273–275

[56] References Cited

U.S. PATENT DOCUMENTS

| | | | |
|---|---|---|---|
| 4,363,102 | 12/1982 | Holmgren et al. | 395/2.47 |
| 5,073,939 | 12/1991 | Vensko et al. | 395/2.5 |
| 5,127,043 | 6/1992 | Hunt et al. | 379/88 |
| 5,339,385 | 8/1994 | Higgins | 395/2.55 |
| 5,548,647 | 8/1996 | Naik et al. | 395/2.09 |
| 5,625,747 | 4/1997 | Goldberg et al. | 395/2.52 |

OTHER PUBLICATIONS

Sorensen et al, "Hierarchical pattern classification for high performance text-independent speaker verification systesm," ICASSP '94, pp. I-157 to I-160, Apr. 1994.

Bendelac et al, "Eyes free dialing for cellular telephones," 1991 Convention on electrical and Electronincs engineers in Isreal, pp. 234–237, Mar. 1991.

Gaganelis et al, "A novel approach to speaker verification," ICASSP '91, pp. 373–376, Jul. 1991.

Rosenberg et al, "Connected word talker verification using whole word hidden markov models," ICASSP '91, pp. 381–384, Jul. 1991.

*Primary Examiner*—Tariq R. Hafiz
*Attorney, Agent, or Firm*—Tammy L. Williams; Leo N. Heiting; Richard L. Donaldson

[57] ABSTRACT

The present invention provides a system and method for performing speaker verification on a spoken utterance. The present invention includes a verification template generator (40) which generates speaker-dependent verification templates for each possible spoken item that may be in the spoken utterance. A speech recognizer (42) performs speech recognition functions on the spoken utterance. A frame mapper (44) marks the beginning and ending of each spoken item within the spoken utterance. Verification module (46) generates a verification signal in response to verifying a minimum number of the spoken items within the spoken utterance being matched with the speaker dependent verification templates.

8 Claims, 2 Drawing Sheets

5,752,231

METHOD AND SYSTEM FOR PERFORMING SPEAKER VERIFICATION ON A SPOKEN UTTERANCE

TECHNICAL FIELD OF THE INVENTION

The present invention relates generally to speech processing and more particularly to a method and system for performing speaker verification on a spoken utterance.

BACKGROUND OF THE INVENTION

Numerous systems use some type of security to prevent unauthorized access to the provided product or services. In many of these systems, the security includes some form of voice recognition or voice activation. In many such situations, however, matching the voice requires entry of numerous voice samples. Furthermore, processing the numerous samples each time access is necessary takes a large amount of computing power and time. This is especially unnecessary when most of the voice content is already known, i.e., when most of the voice content will be numbers, names, code phrases, etc.

SUMMARY OF THE INVENTION

The present invention provides an improved system and method for performing speaker verification on a spoken utterance. The present invention includes a verification template generator which generates speaker-dependent verification templates for each possible phrase that may be in the spoken utterance. A speech recognizer performs speech recognition functions on the spoken utterance. A frame mapper marks the beginning and ending of each digit, if the utterance is numbers, within the utterance. Verification module generates a verification signal in response to verifying a minimum number of the digits within the utterance being matched with the speaker dependent verification templates.

BRIEF DESCRIPTION OF THE DRAWINGS

For a better understanding of the present invention, reference may be made to the accompanying drawings, in which.

DETAILED DESCRIPTION OF THE INVENTION

Figure 1:
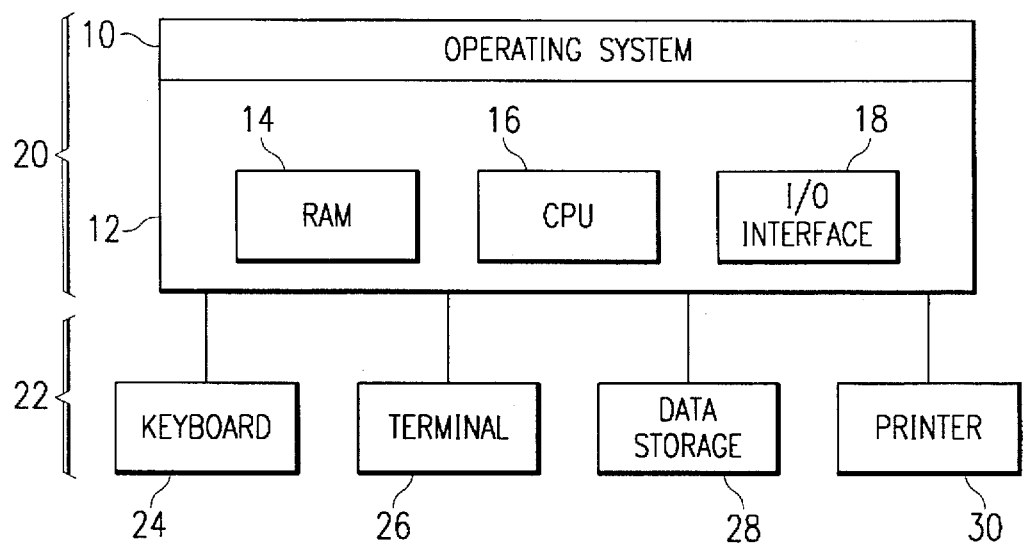
FIG. 1 is a block diagram illustrating an exemplary computer system operable to execute the present invention.

FIG. 1 is a block diagram of an exemplary computer system in which the preferred embodiment of the present invention operates. The exemplary computer system shown in FIG. 1 includes a software portion, operating system 10, and a hardware portion 12. The hardware portion 12 includes a random access memory (RAM) 14, one or more central processing units (CPU) 16, and an input/output (I/O) interface (18). It is contemplated that the CPU 16 may include a digital signal processor (DSP) and that the operating system 10 is any operating system which is executable on the hardware portion 12.

As shown at 22 in FIG. 1, various peripheral components may be connected to the exemplary computer system 20. These peripheral components include a keyboard 24, a terminal 26, a data storage device 28 and a printer 134.

Those skilled in the art will readily understand the equivalents to the above structure.

Figure 2:
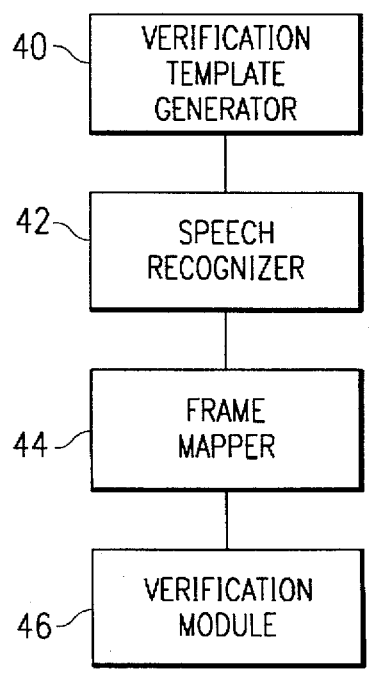
FIG. 2 is a block diagram showing the preferred embodiment of the present invention.

FIG. 2 illustrates the preferred embodiment of a system in accordance with the present invention. The system in FIG. 2 includes a verification template generator 40, a speech recognizer 42, a digit frame mapper 44 and a verification module 46. The operation of each of these components is discussed hereinbelow in connection with the discussion of FIG. 3.

Figure 3:
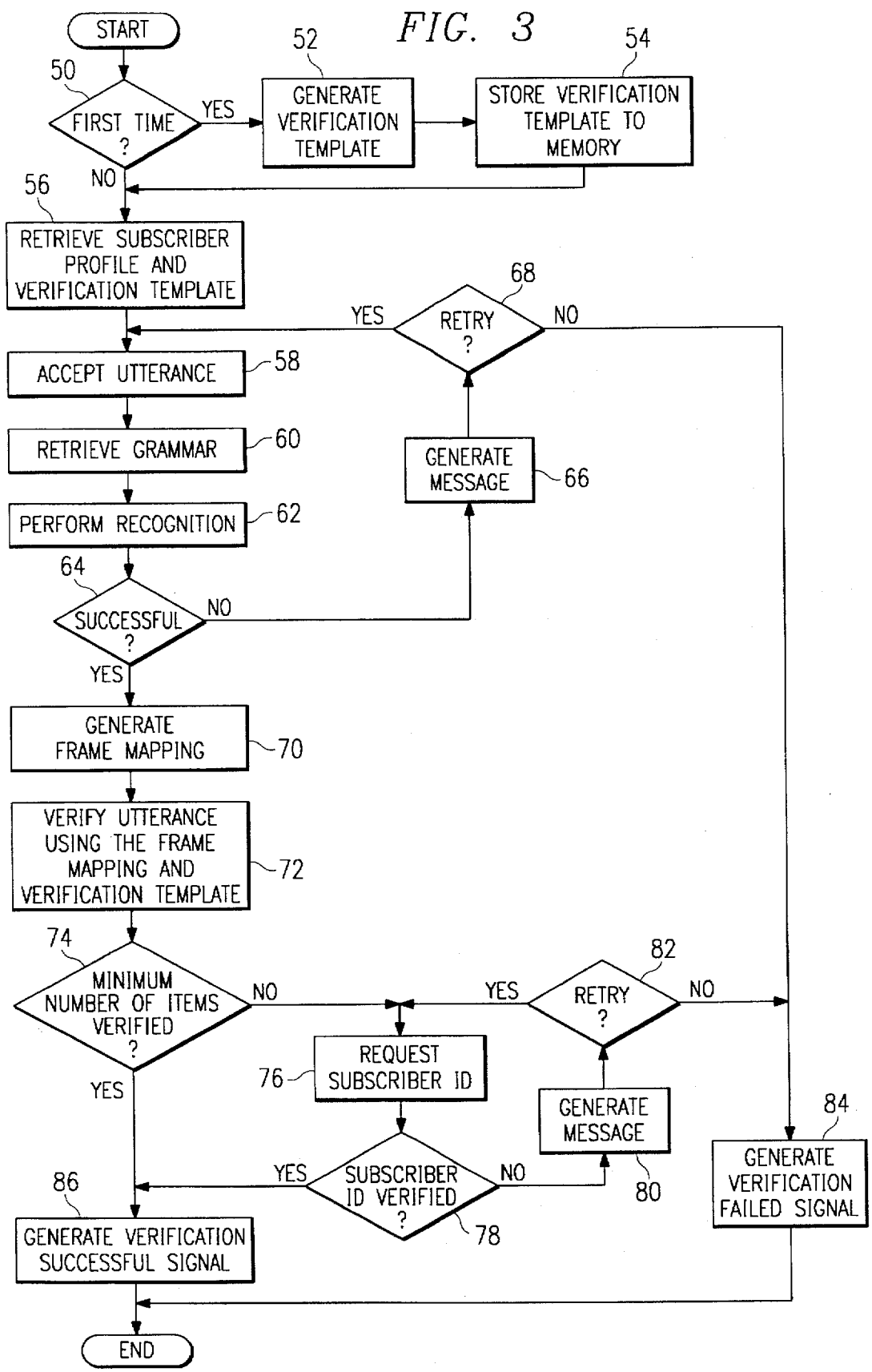
FIG. 3 illustrates a flow diagram of the operation of the preferred embodiment of the present invention.

FIG. 3 depicts a flow diagram illustrative of the operation of the system shown in FIG. 2 in accordance with the present invention.

Although the current embodiment is illustrated in terms of the spoken utterance including only digits, it is contemplated that those skilled in the art will readily understand that the spoken utterance and verification templates in accordance with the present invention can also be used to identify particular spoken items such as letters, phrases, command codes, etc.

As shown in FIG. 3 at decision block 50, if this is the first time the speaker is using the system, verification templates using the verification template generator 40 are generated at block 52. To generate the verification templates, the user is asked to repeat all digits or a set of enrollment phrases which include all digits, a pre-determined number of times. The number of times the digits or enrollment phrases are repeated depends upon the application environment in which the present invention is being used. For example, the user may be asked to repeat the phrases "1234567890" and "Oh" numerous times.

Then, at block 54, the digits are translated into verification template format and stored in a templates database in data storage 28. The stored speaker-dependent verification templates are retrieved and used for verification each time the user accesses the system as shown at block 56. Additional information about the user, i.e., a subscriber profile, may also be generated, stored and retrieved from the data storage 28 along with the speaker-dependent verification templates.

At block 58, an utterance is received from the user, i.e., the user dials a long distance service provider or picks up his/her cellular phone and then says "Dial" followed by a phone number, or simply says the phone number. The speech recognizer 42 is then activated which, at block 60, retrieves associated grammar from data storage 28 and then performs speech recognition functions on the spoken utterance as shown at block 62 to determine the number sequence that was spoken.

If, at decision block 64, the speech recognition process is successful, operation continues at block 70. If, at decision block 64, the speech recognition process is unsuccessful, i.e., a weak or noisy signal, operation continues at block 66 where an appropriate message, i.e., a request to repeat the utterance, is generated. At decision block 68, if the system has already attempted a pre-determined number of times to recognize the utterance and failed, operation continues at block 84 where a verification failed signal is generated and operations terminate. If the pre-determined number of times to attempt recognition of the utterance have not been exhausted, operation continues at block 70.

At block 70, the digit frame mapper 44 generates a digit frame mapping which marks the locations of the start and end of each digit recognized in the spoken utterance.

The linear predictive code (LPC) or mulaw recording of the spoken utterance, generated by the speech recognizer 42, the digit frame mapping, generated by the digit frame mapper 44, and the retrieved speaker-dependent verification templates, generated by the verification template generator 40, are then input into the verification module 46 at block 72.

The verification module 46 attempts to match each digit in the utterance with the corresponding digit in the speaker-dependent verification template. The digit "4" in the utterance, for example, is matched against the digit "4" in the speaker-dependent verification template. If, at decision block 74, a pre-determined minimum number of digits in the utterance are successfully matched with the corresponding number in the speaker-dependent verification template, then a verification successful signal is generated at block 86 and operation terminates.

In matching the digits, the verification module 46 computes a score for each digit which indicates how closely that digit matched with its corresponding digit in the speaker-dependent verification template. In one implementation of the verification module 46, if the score is above a pre-determined threshold, that digit is determined to have been successfully matched. Then, if at least the pre-determined number of the digits are successfully matched, operation continues at block 86 where the verification successful signal is generated.

In another implementation of the verification module 46, the verification module 46 computes an average score from the scores of all the digits successfully matched with its corresponding digit in the speaker-dependent verification template. If the computed average score is then above another predetermined threshold, operation continues at block 86 where the verification successful signal is generated.

If, however, at decision block 74, the minimum number of successfully matched digits or the minimum average score is not achieved, operation continues at block 76 where the user is requested to enter a pre-determined identifier. This pre-determined identifier, which may be stored as part of the user profile, may also be a number and may be entered, for example, using a number keypad. This alternative method of verifying the user is useful if, for example, the user's voice is altered or inaudible due to illness. If, at decision block 78, the alternative identifier is verified, operation again continues at block 86 where a verification successful signal is generated and operations terminate.

If, however, at decision block 78, the alternative identifier is not verified, an appropriate message is generated at block 80 and, at decision block 82, the user is requested to retry entry of the alternative identifier a pre-determined number of times. In the preferred embodiment of the present invention, the user is allowed entry of the alternative identifier only once. If the pre-determined number of tries have been exhausted and were unsuccessful, then the verification failed signal is generated at block 84 and operations terminate.

The processing of spoken utterances in accordance with the present invention occur in either a background or a foreground mode. In a foreground mode, other operations, such as putting through the call or processing selected menu options, are suspended until a verification successful signal is received. In background mode, certain processing operations continue in the foreground while verification in accordance with the present invention is occurring in the background.

In one application of the present invention, a caller can say a phone number to be dialed by, for example, a long distance service provider or a cellular phone service provider and the present invention is used to verify that the caller is authorized to use the account. The present invention thus provides additional security for long distance calling card or cellular phone users to prevent unauthorized use of their accounts.

In another application of the present invention, the present invention is used to provide access to, for example, a locked door or a locked disk drive on a computer, in response to a spoken number authorization code.

Although the present invention has been described in detail, it should be understood that various changes, substitutions and alterations can be made thereto without departing from the spirit and scope of the present invention as defined by the appended claims.

What is claimed is:

1. A system for performing speaker verification on a spoken utterance comprising:

a verification template generator which generates speaker-dependent verification templates for each possible spoken item that may be in the spoken utterance;

a speech recognizer operable to perform speech recognition functions on the spoken utterance;

a frame mapper operable to mark beginning and ending positions of each recognized spoken item within the spoken utterance; and a verification module operable to generate a verification successful signal in response to matching at least a pre-determined number of spoken items within the spoken utterance with the speaker-dependent verification templates, operable to request an alternate identifier in response to not matching said pre-determined number of spoken items with the speaker-dependent verification templates and to generate said verification successful signal in response to matching said alternate identifier with a pre-determined identifier in a stored user profile, and operable to generate a verification unsuccessful signal otherwise.

2. The system of claim 1 wherein said spoken items are digits.

3. The system of claim 1 wherein said spoken items are letters.

4. The system of claim 1 wherein said spoken items are command phrases.

5. The system of claim 1 wherein the speaker is a subscriber to a long distance service provider and wherein the spoken utterance represents a phone number and wherein said long distance service provider dials said phone number upon receipt of said verification successful signal.

6. The system of claim 1 wherein the speaker is using a cellular phone and wherein the spoken utterance represents a phone number and wherein said phone number is dialed upon receipt of said verification successful signal.

7. The system of claim 1 wherein the speaker is attempting to gain access to a lock and wherein the spoken utterance represents an access number to said lock and wherein an access mechanism operates to unlock said lock upon receipt of said verification successful signal.

8. A method of performing speaker verification of a spoken utterance comprising the steps of:

generating speaker-dependent verification templates for each possible spoken item that may be in the spoken utterance at a first time;

storing said speaker-dependent verification templates to memory;

receiving the spoken utterance at a second time;

retrieving said speaker-dependent verification templates from said memory;

performing speech recognition functions on the spoken utterance;

marking starting and ending positions of each recognized spoken item within the spoken utterance;

generating a verification successful signal in response to matching at least a pre-determined number of said spoken items within the spoken utterance with the speaker-dependent verification templates;

requesting an alternate identifier if unable to not match said pre-determined number of spoken items with the speaker-dependent verification templates;

generating said verification successful signal if able to match said alternate identifier with a pre-determined identifier in a stored user profile; and generating a verification unsuccessful signal if unable to match said alternate identifier with said pre-determined identifier.

* * * * *